United States Patent [19]

Sugiyama

[11] Patent Number: 5,477,547
[45] Date of Patent: Dec. 19, 1995

[54] INTER-LAN CONNECTION EQUIPMENT

[75] Inventor: Takashi Sugiyama, Tokyo, Japan

[73] Assignee: Kabushiki Kaisha Toshiba, Kawasaki, Japan

[21] Appl. No.: 282,438

[22] Filed: Jul. 29, 1994

[30] Foreign Application Priority Data

| Jul. 29, 1993 | [JP] | Japan | 5-187978 |
| Nov. 17, 1993 | [JP] | Japan | 5-288099 |

[51] Int. Cl.$^6$ .................................................. H04L 12/46
[52] U.S. Cl. ...................................... 370/85.13; 370/94.1
[58] Field of Search ................................... 370/61, 85.13, 370/85.14, 94.1

[56] References Cited

U.S. PATENT DOCUMENTS

| 5,136,580 | 8/1992 | Videlock et al. | 370/61 |
| 5,343,471 | 8/1994 | Cassagnol | 370/85.13 |
| 5,371,868 | 12/1994 | Koning et al. | 370/61 |

FOREIGN PATENT DOCUMENTS

| 4-21232 | 1/1992 | Japan . |
| 4-2236 | 1/1992 | Japan . |
| 4-237232 | 8/1992 | Japan . |

*Primary Examiner*—Benedict V. Safourek
*Attorney, Agent, or Firm*—Oblon, Spivak, McClelland, Maier & Neustadt

[57] ABSTRACT

An inter-LAN bridge equipment is for performing the following operation. That is, a connected to a plurality of LANs. A LANs includes a destination address and source address is extracted from a terminal address. Address information containing the extracted terminal address and corresponding LAN port address is registered in a table memory at a corresponding entry area. When a packet is received from the LAN after address learning, the packet is inputted to a FIFO memory from its start side and held there. The address information is read out of the table memory and comparison is made, by the terminal address comparing circuit, between the terminal address of the address information and a destination address of the received packet. Further, comparison is also made, by a LAN port address comparing circuit, between a LAN port address of the address information and a receive-side LAN port address. A discard operation is performed when a result of comparison by the terminal address comparing circuit shows a coincidence and a result of comparison by the LAN port address comparing circuit show a coincidence. A forward operation is performed when the result of comparison by the terminal address comparing circuit shows a coincidence and the result of comparison by the LAN port address comparing circuit shows a noncoincidence.

14 Claims, 5 Drawing Sheets

INTER-LAN CONNECTION EQUIPMENT

BACKGROUND OF THE INVENTION

1. Field of the Invention

The present invention relates to an inter-LAN connection equipment for packet forward among LANs (local area network) and, in particular, to an inter-LAN connection equipment as a bridge equipment which can effectively forward or discard a packet after learning of an MAC address (media access control address).

2. Description of the Related Art

Conventionally, an inter-LAN connection equipment (or a bridge equipment) for internal learning of a MAC address receives all packets sent from LANs and discards, out of all the packets, a packet whose destination is directed to a node on the same LAN, that is, discards it without being forwarded. The reason for this is that it is not necessary to forward the packet if it is sent to a given node on the same LAN. If being forwarded, the packet involved causes a lowering in the forward efficiency of a forward-destination LAN. For this reason, the packet, being directed to the given node on the same LAN, has normally been discarded by a microprocessor without being forwarded. In this case, the microprocessor determines whether or not a packet should be discarded in accordance with a control program.

Determining whether the packet supplied from the given LAN should be forwarded or discarded has been done in the program processing by the microprocessor. In the conventional inter-LAN connection equipment, however, communication is often carried out on the same LAN and it takes more time to perform discard processing than an ordinary forward processing. Even if use is made of any high-speed microprocessor, it has been difficult to improve the performance of the inter-LAN connection equipment.

In the conventional inter-LAN connection equipment, a packet sent from the LAN is stored in a buffer memory. Then in the case where the packet is to be forwarded or passed, after it has been fully received from its start portion to its end portion, the transmission of the packet to the forward-side LAN is started. For this reason, more time delay occurs in the transmission of the packet than in the absence of any inter-LAN connection equipment. Therefore, the terminal-to-terminal (LAN-to-LAN) communication performance has been markedly lowered in comparison with the communication performance on the same LAN, thus presenting a problem.

A more high-performance inter-LAN connection equipment has been proposed as shown in KOKAI H-4-237232. In this proposal, control is made so as to prevent reception of any packet not requiring any forward, that is, any packet to be communicated on the same LAN. In this case, control is made on an external hardware.

The description of KOKAI H-4-237232 suggests a practical applicability of the packet discard determination technique to the packet forward determination technique, but there is no suggestion as to achieving a high-speed packet forward. Therefore, there is a demand for achieving a high-speed packet forward unit.

SUMMARY OF THE INVENTION

It is accordingly the object of the present invention to provide an inter-LAN connection equipment which can fastly start the forward of a packet to be passed and enhance a communication performance among terminals.

According to a first aspect of the present invention, an inter-LAN connection equipment connected to at least two LANs is provided, comprising:

address learning means, provided in each LAN, for receiving a packet sent from a given LAN and for generating address information having a transmit-source address in the packet and a port address for distinguishing the given LAN;

table memory address generating means, provided in each LAN, for compressing the transmit-source address in the packet and for generating a table memory address;

a shared table memory for allowing the address information which is generated from the address learning means to be registered in an entry designated with the table memory address generated from the table memory address generating means;

a first in—first out memory, provided in each LAN, for allowing any packet which is sent from any of LANs to be stored therein;

first comparing means, provided in each LAN, for receiving the packet sent from the LAN, for extracting a destination address in the received packet, for taking out the address information from the shared table memory at the corresponding entry and for comparing the destination address with the transmit-source address in the address information;

second comparing means, provided at each LAN, for taking out the address information from the shared table memory at the corresponding entry and for comparing the port address of that LAN corresponding to the transmit-source of the packet with the port address in the address information;

discarding means, provided in each LAN, for discarding the packet when a result of comparison by the first and second comparing means represents a coincidence; and forward means, provided at each LAN, for allowing the packet which is stored in the first in—first out memory to be sent to that LAN corresponding to the port address of the read address information when a result of comparison by the first comparing means shows a coincidence and a result of comparison by the second comparing means shows a noncoincidence.

According to a second aspect of the present invention, an inter-LAN connection equipment is provided in which the forward means includes means for, when the destination address of the packet corresponds to a multicast address, effecting such control as to transmit the packet to all the other LAN sides irrespective of the results of comparison by the first and second comparing means.

By so doing, the FIFO memory earlier allows the delivery of the packet as an output and the switching network performs such control as to connect the output of the FIFO memory to a port of the LAN at a transmit-destination side. It is, therefore, possible to start the forward of a packet, to be passed, to the transmit-destination LAN side, whereby it is possible to perform a forward operation with the same performance as in the communication among the same LAN.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

An embodiment of the present invention will be explained below with reference to the drawings.

Figure 1:
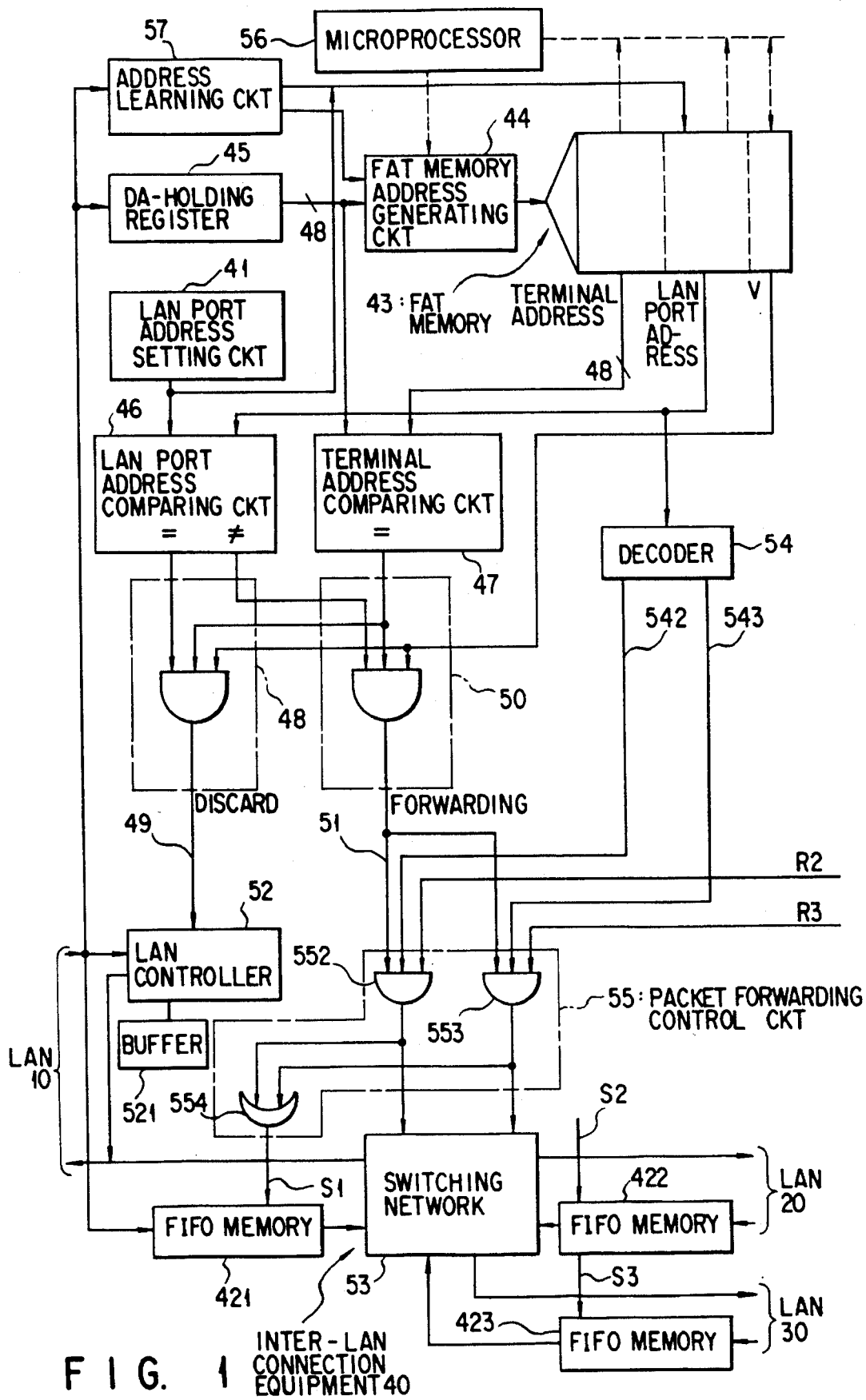
FIG. 1 is a block diagram showing an arrangement of an inter-LAN connection equipment according to a first embodiment of the present invention.

FIG. 1 is a block diagram showing an arrangement of an inter-LAN connection equipment according to a first embodiment of the present invention. In FIG. 1, the arrangement of a connection interface section on the side of one of a plurality of LANs is principally shown. The inter-LAN connection equipment 40 is connected to LANs 10, 20 and 30. That is, the inter-LAN connection equipment 40 is comprised of a bridge equipment for passing a packet among LANs 10, 20 and 30. In the present embodiment, LANs are of a bus type. Nodes (terminals) 11, 12, 13, . . . are connected to LAN 10; nodes (terminals) 21, 22, 23, . . . , to LAN 20 and nodes (terminals) 31, 32, 33, . . . , to LAN 30.

The interior of the inter-LAN connection equipment corresponding to LAN 10 of the three LANs are principally dealt with. Various operations of the inter-LAN connection equipment are controlled under a microprocessor 56. LAN 10 and received at a connection interface (serial interface), not shown, in the inter-LAN connection equipment.

The connection interface sends the received packet to a LAN controller 52, address learning circuit 57, DA (destination address) holding register 45 and FIFO (first in—first out memory) 421.

Figure 3:
FIG. 3 is a view showing a packet format of a packet used in the first embodiment shown in FIG. 1.

The packet packet format, shown in FIG. 3, comprises a PA (preamble), SFD (start packet delimiter), DA (Destination address), SA (source address), DATA (data), TR (trailer) and FG (packet gap), followed by PA (Preamble), . . . , in the next packet.

A LAN controller 52 makes packet forward control between LAN 10 and another LAN and includes a serial/parallel conversion function for conversion of a signal to a serial or parallel one, etc. The LAN controller 52 receives a packet from LAN 10 and stores it in a buffer 521. The LAN controller 52 discards the packet involved, as required, as will be set out below.

The FIFO memory 421 can hold, for example, a one-bit wide serial data. The FIFO memory 421 receives serial data from LAN 10 and holds it until it receives an instruction of whether or not the packet should be forwarded. Further, the FIFO memory 421 delivers the packet, in accordance with an instruction of forwarding. For this reason, from the reception of header data of the packet until the reception of an instruction of whether or not the packet should be forwarded, the FIFO memory 421 has a memory capacity for holding intervening data. If it is determined that the packet be forwarded, there is sometimes the case where a transmit-side LAN port (for example, a port on the LAN 20 side) is now in service. Taking such a case into consideration, an FIFO memory is adopted which has the ability to receive one packet length. The output operation of the FIFO memory 421 is started responsive to a forward start signal S1 from a packet forward control circuit 55 as will be set out below.

In the inter-LAN connection equipment 40, a 1-bit wide FIFO 422 is provided on the LAN 20 side to receive a packet (serial data). Similarly, for example, a 1-bit wide FIFO memory 423 is provided on the LAN 30 side to receive a packet (serial data). The output operation of the FIFO memory 422 is started responsive to a forward start signal S2 from a packet forward control circuit (not shown) on the LAN 20 side. Similarly, the output operation of the FIFO memory 423 is started responsive to a forward start signal S3 from a packet forward control circuit (not shown) on the LAN 30 side.

The address learning circuit 57 has the function of learning which node (terminal) is connected to LAN 10. That is, the address learning circuit 57 is responsive to a packet from LAN 10 to learn based on a transmit-source address SA in that packet. In other words, the address learning circuit 57 extracts, as a terminal address, the transmit-source address SA (48 bits) in the packet and sends it to an FAT (Filtering Address table) memory address generating circuit 44. In accordance with an FAT memory address generated from the FAT memory address generating circuit, the address learning circuit 57 writes, in the FAT memory 43 at a predetermined location, address information containing a LAN port address, terminal address and V bit. The LAN port address in this case is sent from a later-described LAN port address setting circuit 41 and indicates that the address information corresponds to the LAN 10 side.

On the other hand, the DA (Destination address) holding register 45 receives the destination address DA (48 bits), in a serial way, in the packet from LAN 10 and holds it.

Figure 4:
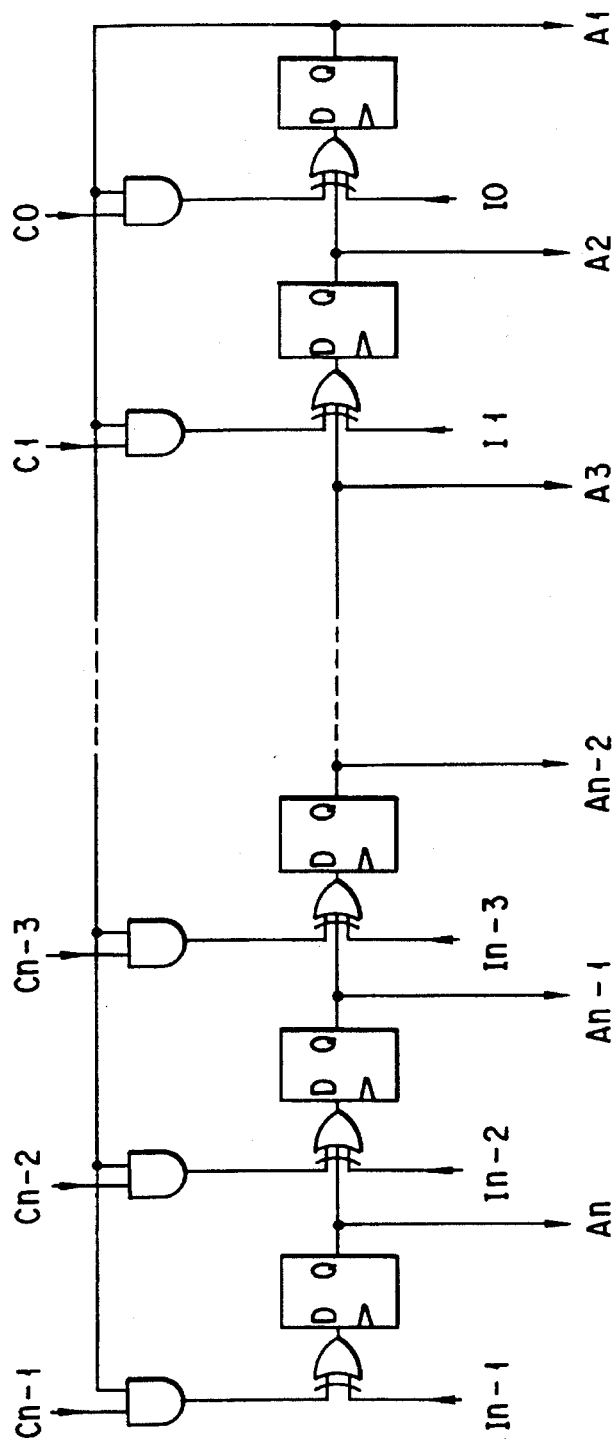
FIG. 4 is a circuit arrangement for handling on a generation polynomial used in the first embodiment shown in FIG. 1.

The FAT memory address generating circuit 44 compresses the terminal address (transmit-source address SA) from the address learning circuit 57 or destination address DA held in the DA holding register 45 to generate the FAT memory address (entry address). The FAT memory address generating circuit 44 includes a CRC (cyclic redundancy check) circuit as shown in FIG. 4. The CRC circuit compresses a 48-bit terminal address on the basis of a generation polynomial (data for compression) set by the microprocessor 56 as will be later described and generates an FAT memory address as a CRC code. It is to be noted that C0, C1, . . . , Cn-3, Cn-2, Cn-1 represent data of the generation polynomial entered, that I0, I1, . . . , In-3, In-2 and In-1 represent data based on the terminal addresses entered, and that A1, A2, A3, . . . , An-2, An-1 and An represent output CRC codes.

The FAT memory address generating circuit 44 sends the FAT memory address to the FAT memory 43. The FAT memory address designates an entry position in the FAT memory where the address information above is written.

The FAT memory 43 serves as a common memory where not only the address information from the LAN 10 side but also address information from the LANs 20 and 30 sides are stored. The FAT memory 43 has a plurality of entries for registering address information containing the terminal address and LAN address. The entry address in the FAT memory 43 corresponds to the terminal address of the address information registered at the entry. The entry address is represented by the CRC code generated based on the terminal address and generation polynomial. If any duplication of the address information occurs in the FAT memory, the microprocessor 56 has the ability to eliminate such duplication through the rewriting of the generation polynomial for use in the FAT memory address circuit 44. By so doing it is possible to enhance the utilization efficiency of the FAT memory.

Figure 5:
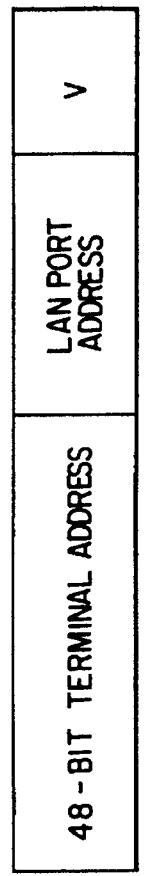
FIG. 5 is a format of address information registered in an FAT memory shown in FIG. 1.

The format of the address information registered in the FAT memory 43 will be explained below with reference to FIG. 5. The address information is comprised of, as shown in FIG. 5, 48-bit terminal address (or node address, MAC address), LAN port address representing the type of LAN connected to the terminal designated with the terminal address, and V bit (validity/invalidity bit) representing whether or not the address information is valid.

Referring back to FIG. 1, the LAN port address setting circuit 41 holds a LAN port address for distinguishing the LAN 10 and delivers the LAN port address as an output when the address information from the address learning circuit 57 is written into the FAT memory 43.

A LAN port address comparing circuit 46 compares the LAN port address (here the port address of LAN 10) from the LAN port address setting circuit 41 with the LAN port address of the address information read out of the FAT memory 43 and delivers a coincidence signal when these addresses coincides with each other and a noncoincidence signal when these signals do not coincide with each other. On the other hand, a terminal address comparing circuit 47 compares the destination address DA held in the DA holding register 48 with the terminal address of the address information read out of the FAT memory 43 and delivers a coincidence signal when there occurs a coincidence between these addresses. As a result, through a combination of the LAN port address comparing circuit 46 and terminal address comparing circuit 47, it is possible to determine whether or not the terminal, that is, the terminal having the same address (terminal address) as the destination address DA held in the DA holding register 45, is connected to the same LAN (here, LAN 10) as the transmit-source terminal.

A packet discard instructing circuit 48 performs a discard instruction when the condition is met. That is, the packet discard instructing circuit 48 receives a V of in the address information from the FAT memory and delivers a packet discard signal 49 representing the discarding of the packet both when the V bit shows a valid display state (ON state) and when the circuit 48 detects these coincidence signals from the comparing circuits 46 and 47. It is to be noted that the packet discard instruction circuit 48 is comprised of, for example, an AND gate.

The LAN controller 52 receives a packet discard signal 49 from the packet discard instruction circuit 48 and performs that packet discard processing.

A packet forward instruction circuit 50 implements a discard instruction when the condition is met. That is, the packet forward instruction circuit 50 receives the V bit of the address information from the FAT memory and delivers a packet forward signal 51 showing the forward of the packet both when the V bit represents a valid display state (ON state) and when the circuit 50 detects a noncoincidence and coincidence signal from the comparing circuits 46 and 47, respectively. It is to be noted that the instruction circuit 50 is comprised of, for example, an AND gate.

A switching network 53 connects the port of the receive-side LAN of LANs 10, 20 and 30 to that of the transmit-side LAN. The switching network 53 selectively connects the outputs of the FIFO memories 421, 422 and 423 which correspond to LANs 10, 20 and 30 to the LAN port to be forwarded. In this case, the LAN port to be forwarded is the same as the LAN port designated with the LAN port address in the received packet.

The decoder 54 decodes the LAN port address of the address information from the FAT memory 43. If LAN 20 is designated with the LAN port address, the decoder 54 delivers a LAN port select signal 542 showing that LAN 20 has been selected. If, on the other hand, LAN 30 is designated with the LAN port address, the decoder 54 delivers a LAN port select signal 543 showing that LAN 30 has been selected.

A packet forward control circuit 55 controls the FIFO memory 421 and switching network 53 so as to selectively connect the output of the FIFO memory 421 to the port of LAN 20 or 30. The control circuit 55 is comprised of AND gates 552 and 553 and OR gate 554.

The AND gate 552 delivers a signal to the switching network 53 and OR gate 554 when it detects a LAN port select signal 542 from the decoder 54, a packet forward signal 51 from the packet instruction circuit 50 and a ready signal R2 from a LAN controller, not shown. Here, the ready signal R2 is sent from a controller, not shown, for LAN 20 in a connection interface section on the LAN 20 side in the inter-LAN connection equipment 40. The controller for LAN 20 delivers the ready signal R2 when a packet is ready for reception from the LAN 10 side.

The AND gate 553 delivers a signal to the switching network 53 and OR gate 554 when it detects a LAN port select signal 543 from the decoder 54, a packet forward signal 51 from the packet forward instruction circuit 50 and a ready signal R3 from a LAN controller, not shown. Here, the ready signal R3 is sent from a controller, not shown, for LAN 30 which is provided at a connection interface section on the LAN 30 side of the inter-LAN connection equipment 40. The controller for LAN 30 delivers a ready signal R3 when a packet is ready for reception from the LAN 10 side.

The OR gate 554 delivers a forward start signal S1 to the FIFO memory 421 when it detects the outputs from the AND gates 552 and 553. The forward start signal S1 represents an instruction for the starting of the delivery of the packet to the FIFO memory 421.

Responsive to a forward start signal S1 from the OR gate 554, the FIFO memory 421 sends its held packet to the switching circuit 53.

Upon detecting a signal from the AND gate 552, the switching network 53 connects the port on the LAN 10 side to that on the LAN 20 side so that a corresponding packet is sent from the FIFO memory 421 to the LAN 20 side. Upon detecting a signal from the AND gate 553, on the other hand, the switching network 53 connects the port on the LAN 10 side to that on the LAN 30 side so that a corresponding packet is sent from the FIFO memory 421 to the LAN 30 side.

Though not shown in FIG. 1, the inter-LAN connection equipment 40 includes, at the connection interface to LANs 20 and 30, the same constituent elements as a LAN port address setting circuit 41, FAT memory address generating circuit 44, DA holding register 45, comparing circuits 46, 47, packet discard instruction circuit 48, packet forward instructing circuit 50, LAN controller 52, decoder 54 and packet forward control circuit 55.

Now the operation of the first embodiment will be explained below.

The inter-LAN connection equipment 40 is controlled by the microprocessor 56. At an initial state, the microprocessor sets the contents of each entry in the FAT memory 43 all to an invalid state. In this case, the microprocessor 56 renders the V bit in each entry in the OFF state.

With the LAN controller 52 set to a promiscuous mode, the microprocessor 56 enables the inter-LAN connection equipment to function as a bridge. A serial packet from LAN 10 is received at the connection interface to the inter-LAN connection equipment 40. The packet, received at the LAN controller 52, is temporarily stored in the buffer 521.

In the full receive mode, while the packet is being stored in the buffer 521, the address learning circuit 57 extracts, as a terminal address, a 48-bit transmit-source address SA in the received packet.

The address learning circuit 57 supplies the extracted address (transmit-source address SA) to the FAT memory address generating circuit 44. Then in the FAT memory address generating circuit 44, the terminal address is compressed through the utilization of a given generation polynomial and an FAT memory address (write address) is generated.

Into the FAT memory entry designated with the generation FAT memory address the address learning circuit 57 writes address information containing a LAN port address, terminal address and V bit. The LAN port address of the address information which is written into the FAT memory 43 shows a value representing LAN 10 set in the LAN port address setting circuit 41. Further, the terminal address in the address information corresponds to the extracted transmit-source address SA. Here the V bit is set to an ON (V=1) state.

The above is an explanation on the address learning by the address learning circuit 57. After the above address learning has been implemented, a packet of those packets received from LAN 10, that is, a packet having a destination address of the same value as that of the terminal address registered in the FAT memory 43 through the address learning, ceases to be received by the LAN controller 52 because, as will be set out below, a packet discard signal 49 is output from the packet discard instructing circuit 48 to the LAN controller 52.

It is to be noted that the address learning is normally made through the address learning circuit 57. Further, when the address learning circuit 57 receives, from the LAN 10 side, packet having a transmit-source address SA not registered in the FAT memory, it registers the address SA as a terminal address in a form to be contained in address information.

Figure 6:
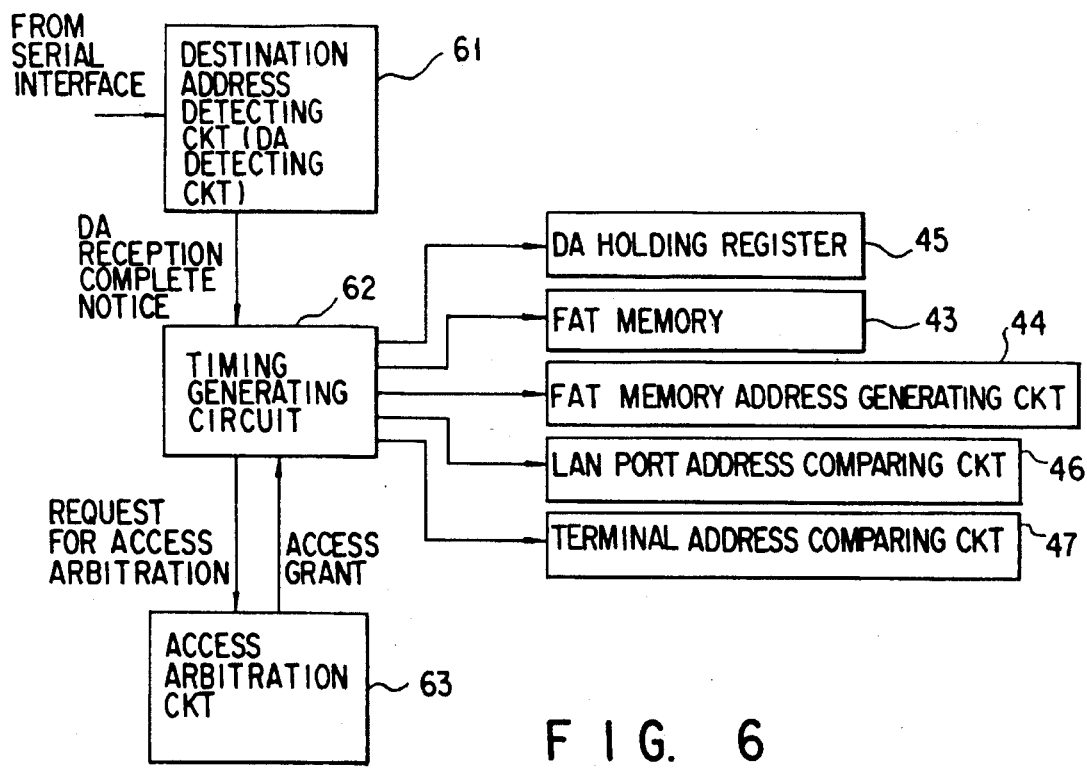
FIG. 6 is a detail block diagram showing an interface section between inter-LAN connection equipment and LAN 10; equipment and LAN 10.

The operation following the address learning will be explained below. Here, reference is made to FIGS. 6 and 1 conjointly in supporting the following explanation.

A transmit packet from the LAN 10 side is received via a serial interface, not shown. The packet (received serial data) thus received is fed to the FIFO memory 421, DA holding register 45, LAN controller 52 and address learning circuit 57. By so doing, the received serial data is stored in the 1-bit data wide FIFO memory 421 sequentially with its header side ahead and held there, while it is shift-input bit by bit in the DA holding register 45 of a 48-bit configuration. The serial data is received by the LAN controller 52 to allow it to be converted to parallel data and is sequentially stored in the buffer 52. It is to be noted that the contents in the FIFO memory 421 and in the buffer 521 are cleared at a start of inputting and holding one received packet.

In accordance with a predetermined packet format a destination address detecting circuit (DA detecting circuit) 61 at a connection interface section of the LAN 10 side (see FIG. 6) detects a 48-bit destination address DA from the packet received via the serial interface. When the destination address detecting circuit 61 detects a final bit of the destination address DA, it regards this as "the reception of DA is complete", informing this effect to a timing generating circuit 62 at the connection interface section of LAN 10.

The timing generating circuit 62 instructs the DA holding register 45 to stop the shift operation in accordance with a DA detecting timing. At the same time, the timing generating circuit 62 requests an access arbitrating circuit 63 to make an arbitration for access to the FAT memory 43. The reason for the access arbitration thus required is as will be set out below. That is, even at LANs 20 and 30, a timing generating circuit is provided which is similar to the timing generating circuit 62 on the connection interface to LAN 10. The respective timing generating circuit gains access to not only the microprocessor 56 but also the FAT memory 43. It is, therefore, necessary to arbitrate each access.

When access is granted by the access arbitrating circuit to the FAT memory, the timing generating circuit 62 gives an FAT memory address generation instruction corresponding to the contents in the DA holding register 45 to the FAT memory address generating circuit 44, a memory access signal to the FAT memory 43 for address information readout, and a compare operation instruction to the comparing circuits 46 and 47.

The shift operation of the DA holding circuit 45 is stopped at a time in which an instruction is made from the timing generating circuit 62 to stop the shift operation. At this time, the DA holding register 45 holds a 48-bit destination address DA in the received packet.

The FAT memory address generating circuit 44 compresses the destination address DA in the DA holding register 45 by a given generation polynomial (compression data initially set in the microprocessor) in an address generation instruction timing from the timing generating circuit 62 to generate a FAT memory address. Here, a CRC signal (about 8 to 16 bits) of the 48-bit destination address DA is generated with the FAT memory address.

The FAT memory address of the FAT memory address generating circuit 44 is supplied to the FAT memory 43 as shown in FIG. 1. By so doing, a given entry of the FAT memory addressed from the FAT memory address generating circuit 44 is accessed in a memory access timing from the timing generating circuit 62 so that address information in the corresponding entry is read out.

The terminal address of the address information read from the FAT memory 43, together with the destination address DA in the DA holding register 45, is supplied to the terminal address comparing circuit 47 where comparison is made between the terminal address and the destination address DA in accordance with a comparison operation instruction from the timing generating circuit. The comparing circuit 47 delivers a result of comparison as an output corresponding to a coincidence or a lack of a coincidence.

A LAN port address of the address information read out of the FAT memory, together with a LAN port address (address characteristic of LAN 10) set in the LAN port address setting circuit 41, is supplied to the LAN port address comparing circuit 46. The comparing circuit 46 compares both the LAN port addresses based on a compare operation instruction from the timing generating circuit 62 and delivers a result of comparison as an output representing a coincidence or a lack of a coincidence.

The results of comparison from the comparing circuits 46, 47 are supplied to the packet discard instruction circuit 48. The V bit of the address information read out of the FAT memory 43 is also supplied to the packet discard instruction circuit 48.

The packet discard instruction circuit 48 delivers a packet discard signal 49 when the results of comparison by the comparing circuits 46 and 47 represent a coincidence and V bit is ON (V=1). That is, when the V bit is ON (ON: the address information read from the FAT memory 43 is valid), the contents (destination address DA) of the DA holding register 45 coincides with the terminal address (address of an earlier learned node) read from the FAT memory 43 and LAN port addresses coincide with each other, then the source and the destination terminal exist on the same LAN. For this reason, the packet discard instructing circuit 48 regards this as there being no need to pass the packet and delivers a packet discard signal 49.

The results of comparison by the comparing circuit 46 for noncoincidence detection and result of comparison by the comparing circuit 47 for coincidence detection are supplied to the packet forward instructing circuit 50. The V bit of the address information read out of the FAT memory 43 is also supplied to the packet forward instructing circuit 50.

The packet forward instructing circuit 50 delivers a packet forward signal 51 when a noncoincidence is obtained upon comparison by the comparing circuit 46, coincidence is obtained upon comparison by the comparing circuit 47 and V bit is ON. That is, when, in the packet forward instructing circuit 50, the V bit is ON (ON: the address information read out of the FAT memory 43 is found valid), contents (destination address DA) of the DA holding register 45 coincides with the terminal address read out of the FAT memory 43 and LAN port addresses do not coincide with each other, the packet transmit source and destination terminal do not exist on the same LAN. For this reason, the packet forward instructing circuit 50 regards this as there being a need to pass the packet and delivers a packet forward signal 51.

The packet discard signal 49 from the packet discard instructing circuit 48 is supplied to the LAN controller 52. When the packet discard signal 49 is output from the packet discard instructing circuit 48, the LAN controller 52 stops receipt of the packet at that time, being in readiness for the next packet reception (or transmission). At this time, the data now being received is left in the FIFO memory 421 and buffer 521. When a new packet is next received from the LAN 10 side, the FIFO memory 421 and buffer 521 are cleared. The contents in the memory FIFO memory 421 and buffer 521 can be cleared in accordance with the packet discard signal 49.

On the other hand, the packet forward signal 51 from the packet forward instructing circuit 50 is supplied to the packet forward control circuit 55 and hence simultaneously to the AND gates 552 and 553 in the packet forward control circuit 55. The AND gate 552 receives a LAN port select signal 542 from the decoder 54 and ready signal R2 from the LAN controller on the LAN 20 side. The AND gate 553 receives a LAN port select signal 543 from the decoder 54 and ready signal R3 from the LAN controller on the LAN 30 side. The LAN port select signal 542 is enabled (logic level=1) when the LAN port address from FAT memory shows LAN 20. A LAN port select signal 543 is enabled (logic level=1) when the LAN port address read from the FAT memory shows LAN 30. Further, the ready signal R2 is enabled (logic level=1) when the port of LAN 20 is put in an available state (a ready state) and disabled (logic level=0) when in use (in a busy state). The ready signal R3 is enabled (logic level=1) when the port of LAN 30 is placed in an available state (ready state) and disabled (logic level=0) when in use (in the busy state).

When the packet forward signal 51 from the packet forward instructing circuit 50, LAN port select signal 542 from the decoder 54 and ready signal R2 from the LAN controller are enabled (logic level=1), then the AND gate 552 delivers a logic 1 signal to the switching network 53 so that the output of the FIFO memory 421 may be connected to the port of LAN 20.

On the other hand, when the packet forward signal 51 from the packet forward instructing circuit 50, LAN port select signal 543 from the decoder 54 and ready signal R3 from the LAN controller on the LAN 30 side are enabled (logic level=1), then the AND gate 553 delivers a logic 1 signal to the switching network 53 so that the output of the FIFO memory 421 may be connected to the port of LAN 30.

Both signals of the AND gates 552 and 553 are input to the OR gate 554. When any of the signals from the AND gates 552 and 553 is or are enabled (logic level=1), the OR gate 554 delivers a forward starting signal S1 to the FIFO memory 421.

When any enable (logic lever 1) signal is received from the AND gate 552 or AND gate 553, the switching network 53 connects the output of the FIFO memory 421 selectively to LAN 20 or LAN 30. That is, a switching operation is carried out.

At this time, the forward starting signal S1 from the OR gate 554 in the packet forward control circuit 55 is fed to the FIFO memory 421. By so doing, the FIFO memory 421, effecting a continuous sequential inputting/holding of the packet (received serial data) received from the LAN 10 side via the serial interface, delivers the inputted/held packet as an output in a sequential way.

The packet from the FIFO memory 421 is passed, via the switching network 53, to a transmit side (LAN 20 or LAN 30 side) designated with the LAN port address of the address information read out of the FAT memory 43.

Figure 2:
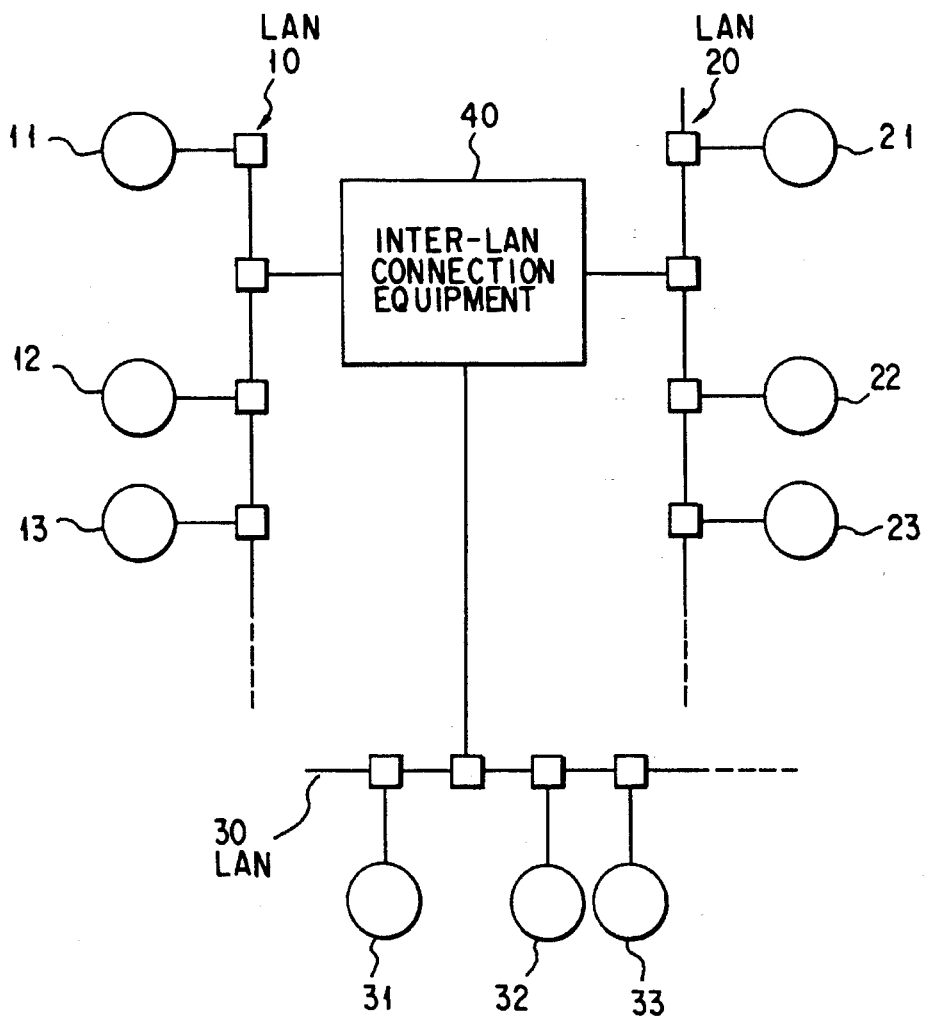
FIG. 2 is a schematic view showing a relationship of a connection between an inter-LAN connection equipment and a plurality of LANs shown in FIG. 1.

The inter-LAN connection equipment 40 as shown in FIG. 2 receives, via a serial interface, the packet which is transmitted from the LAN 10 side. Thereafter, a somewhat small delay occurs until the packet forward signal 51 is generated by the packet forward instructing circuit 50 and hence the forward start signal S1 is generated by the packet forward control circuit 55. Immediately after the somewhat small time delay, it is possible to start the forward of the packet received from the LAN 10 side via the serial interface to the LAN port on the transmit side via the FIFO memory 421 and switching network 53. In the case where the LAN port on the transmit side is available particularly at a point of time in which the packet forward signal 51 is generated by the packet forward instructing circuit 50, that is, the packet forward is determined, then it is possible to start an immediate forward operation and, even if communication is made relative to a terminal connected to a different LAN, achieve nearly the same performance as in an inter-LAN communication. Since the packet (received serial data) can be forwarded straight through the 1-bit wide FIFO memory 421 and switching network 53 without forwarding the data after it has been received by the LAN controller 52 and subjected to a serial/parallel conversion, less number of signal lines can be achieved as signal lines required for packet forward.

Figure 7A:
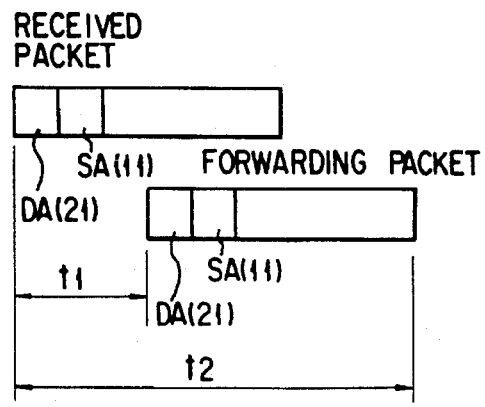
FIGS. 7A and 7B are diagrams showing a delay time involved when a packet is forwarded.
Figure 7B:
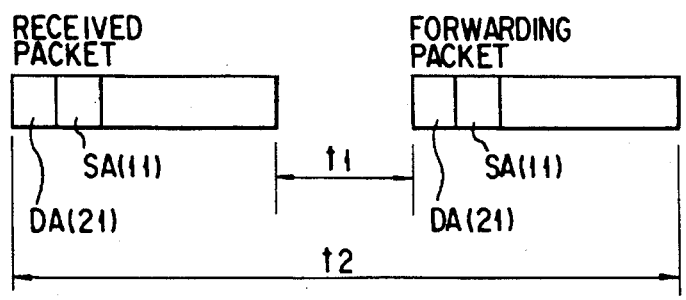

FIGS. 7A and 7B shows a time relation from the reception of a packet to its forward in the inter-LAN connection equipment 40. FIG. 7A shows a forward state of a packet in the inter-LAN connection equipment 40, while FIG. 7B shows a forward state of a packet in the conventional inter-LAN connection equipment. It may be considered that, in the case shown in FIGS. 7A and 7B, the destination is, for example, at the terminal 21 on the LAN 20 and its transmit source is, for example, at the terminal 11 on LAN 10.

In FIGS. 7A and 7B, a time t1 shows a time (a forward handling procedure time) taken for handling the determination of a packet forward (forward procedure handling) and a time t2 shows a time (total forward time) taken from the reception of the packet's start data to the packet's end data. Further, DA (21) represents the terminal address of the terminal 21 and SA (11), a terminal address of the terminal 11.

In the conventional inter-LAN connection equipment as shown in FIG. 7B, a forward procedure handling is carried out after one packet has been received and the forward of the packet is started in accordance with a result of forward procedure handling. In the inter-LAN connection equipment 40 (see FIG. 7A) of the present invention, forward procedure handling is carried out from a start of receiving the DA in the packet and, even if the reception of one packet is not completed, the forward of the packet is started in accordance with a result of forward procedure handling.

The explanation thus for made corresponds to the case where the transmit-side LAN port is in an available state (ready state) when a packet forward instruction signal 51 is output from the packet forward instructing circuit 50. In the case where the transmit-side LAN port is now in use (in a busy state), that is, not available, a logic 1 signal and forward start signal S1 are not delivered from the AND gate 552 (or 553) and OR gate 554, respectively, in the packet forward control circuit 55.

The FAT memory address generating circuit 44 has thus far been explained as being comprised of a CRC circuit. In order to generate an FAT memory address, the destination address or transmit source address SA is compressed with the use of the generation polynomial for CRC code generation.

However, the present invention is not restricted to the application of the CRC circuit and any proper circuit can be employed if it can compress DA with the use of data for compression.

Although, according to the present invention, the 1-bit wide FIFO memories 421 to 423 have been explained as being used so as to hold a packet from LAN 10, 20 or 30 until it is determined whether or not the packet is forwarded, it is possible to use a multi-bit wide FIFO memory. Since, in this case, a packet, coming from LAN 10 for example, is received by the LAN controller 52 and serial/parallel converted to parallel data, it is only necessary to sequentially input the so converted parallel data to the multi-bit wide FIFO memory and hold it there. According to this procedure, however, a corresponding switching network 53 becomes complex and much more signal lines are involved. Instead of the FIFO memory use can be made of a dual-port buffer memory for simultaneous inputting and outputting.

Although, in the present embodiment, a received packet from LAN 10 has been explained as being discarded and forwarded, it is possible to discard or forward the packet from the LANs 20 and 30 sides by providing the same arrangement as shown in FIG. 1 to a connection interface section of LANs 20 and 30. It is to be noted that the FAT memory, switching network and microprocessor are shared between LANs 20 and 30.

Although, in the present embodiment, the present invention has been explained as being applied to the inter-LAN connection equipment connected to the bus-type LANs, it can also be applied to, for example, an inter-LAN connection equipment connected to, for example, a ring-type LANs.

According to the first embodiment as set out above, address learning is carried out based on a transmit-source address (terminal address) of a packet sent to any LAN. Then the terminal address extracted and address information containing a corresponding LAN port address are registered in the table memory at the entries. If the packet is received from any LAN after address learning, it is sequentially input to the FIFO memory from its start side and held there. On the other hand, the address information is read out from the table memory and comparison is made, by the terminal address comparing circuit, between the terminal address in the address information and the destination address in the received packet. Further, comparison is made, by the LAN port address comparing circuit, between the LAN port address in the address information and the LAN port address on the receive side. In the case where a coincidence occurs as a result of comparison by the terminal address comparing circuit and a coincidence as a result of comparison by the LAN port address comparing circuit, a discard operation is performed. In the case where a coincidence occurs as a result of comparison by the terminal address comparing circuit and a noncoincidence as a result comparison by the LAN port address comparing circuit, a forward operation is performed. In the forward operation, the FIFO memory is allowed to deliver the packet under control and the switching network is connected to the transmit LAN side. Therefore, the forward of the packet to the transmit destination LAN side can be started before the reception of the packet is complete. By so doing, it is possible to perform a forward operation with almost the same performance as that obtained when communication is carried out in the same LAN area.

Further, since, in the 1-bit wide FIFO memory, a packet sent from some LAN is inputted to the FIFO memory from the start side and held there and then forwarded to the destination side via the switching network, it is possible to reduce the number of signal lines required.

A second embodiment of the present invention will now be explained below.

Although, in the first embodiment, the destination address of a received packet coming from LAN 10 has been explained as being an individual address, the forward control by the first embodiment can be applied to the case where the destination address corresponds to a multicast address, that is, a packet (multicast packet) required to be passed to the other all LANs connected to the inter-LAN connection equipment is received. Such an applied form will be explained below with reference to FIG. 8.

Figure 8:
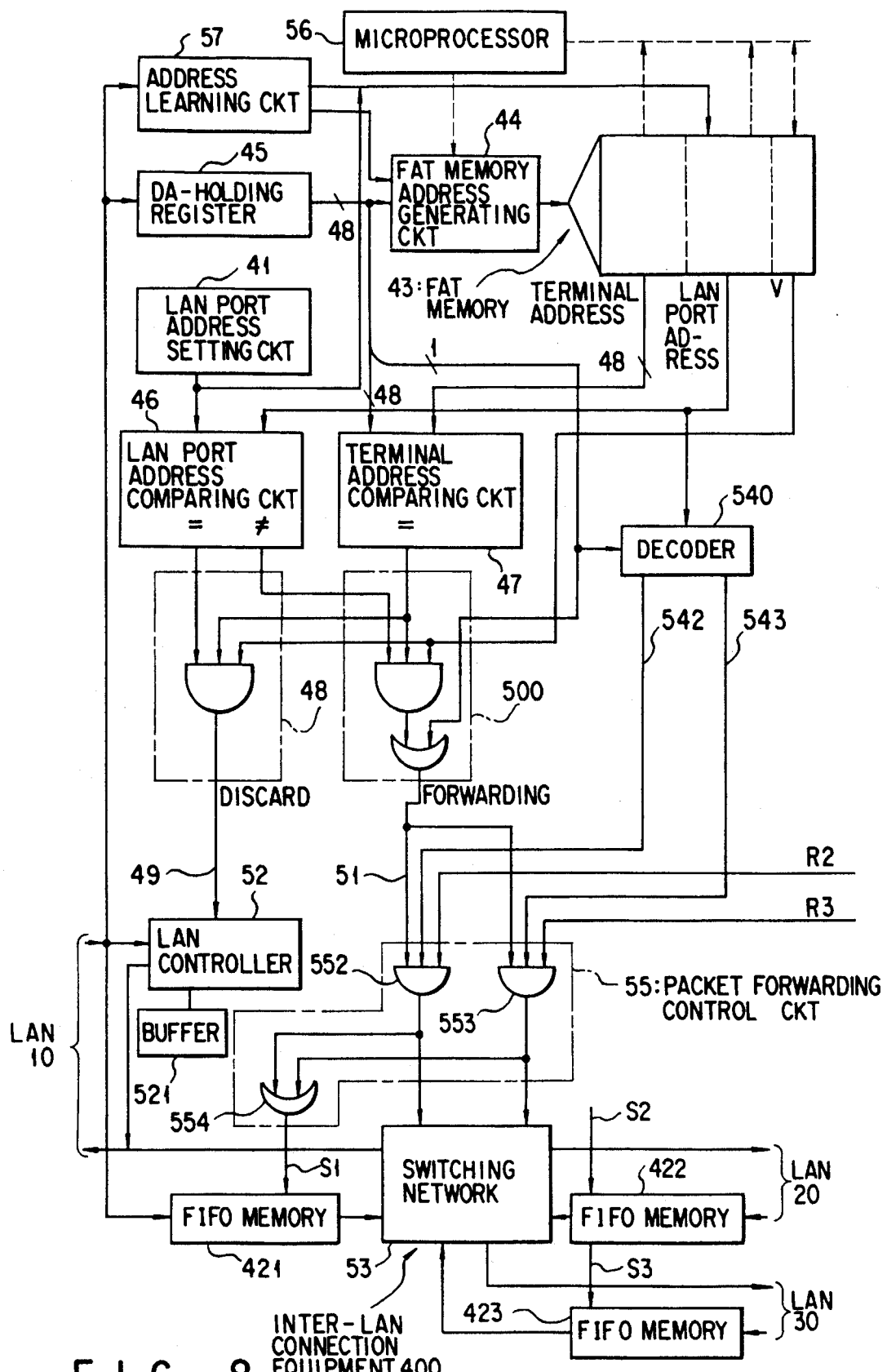
FIG. 8 is a block diagram showing an inter-LAN connection equipment according to a second embodiment of the present invention.

FIG. 8 is a block diagram showing an arrangement of an inter-LAN connection equipment according to a second embodiment of the present invention. The inter-LAN connection equipment 400 shown in FIG. 8 is comprised of the inter-LAN connection equipment 40 plus a new function. For brief in explanation below, the same reference numerals are employed to designate parts or elements corresponding to those shown in the first embodiment.

The inter-LAN connection equipment 400 has, in addition to the forward control function of the inter-LAN connection equipment 40 in the first embodiment, a forward control function which, in the case where the destination address is of a multicast type, enables a received packet (multicast packet) which is inputted to a FIFO memory and held there to be simultaneously passed to the other all LAN sides via a switching network 53 irrespective of the output of a FAT memory 43.

The inter-LAN connection equipment 400 is different from the inter-LAN connection equipment 40 in the following respects. In place of the packet forward instructing circuit 50 and decoder 54 in the inter-LAN connection equipment 40, the inter-LAN connection equipment 400 includes a packet forward instructing circuit 500 and decoder 540.

As in the case of the packet forward instructing circuit 50 in FIG. 1, the packet forward instructing circuit 500 delivers a packet forward signal 51 when a noncoincidence occurs at a comparing circuit 46 and a coincidence at a comparing circuit 47 and a V bit of address information coming from a FAT memory 43 is in a valid display state (ON state) and delivers a packet forward signal in the case where a destination address DA (48 bits) in the DA holding register 45 is a multicast address.

Normally, a given bit (for example, a lowest significant bit) of a destination address DA (terminal address showing a destination terminal) corresponds to a multicast designation bit. Whether or not a multicast address is involved is represented by whether or not the multicast designation bit is "1". In the case where the packet forward instructing circuit 500 receives a result of comparison representing a noncoincidence from the comparing circuit 46 and a result of comparison representing a coincidence from the comparing circuit 47 and a multicast instructing bit (multicast designation bit in the address DA) representing "1" from the FAT memory 43, it delivers a packet forward signal 51 irrespective of the noncoincidence result and coincidence result from the comparing circuits 46 and 47 and V bit, of the address information from the FAT memory 43.

As in the case of the decoder 54 shown in FIG. 1, the decoder 540 decodes a LAN port address of the address information from the FAT memory 43 and delivers a LAN port select signal 542 when the LAN port address designates LAN 20, a LAN port select signal 543 when the LAN port address designates LAN 30 and two LAN port select signals 542 and 543 unconditionally when a multicast designation bit of the designation address DA in the DA holding register 45 is "1".

The following is an operation upon reception of a packet (hereinafter referred to as a multicast packet) in an inter-LAN connection equipment 400. First, a multicast packet is sent from LAN 10 to the inter-LAN connection equipment 400 at a serial interface. The multicast packet is sequentially inputted, bit by bit, to the FIFO memory 421 from its start side and held there, while, at the same time, it is shift-inputted, bit by bit, to the DA holding register 45. The multicast packet is also supplied to a LAN controller 52 and address learning circuit 57. The multicast packet supplied to a LAN controller 52 is converted to parallel data and sequentially stored in a suffer 521.

The DA holding register 45 holds a destination address DA (multicast address) of the multicast packet coming from LAN 10. In accordance with a multicast designation bit of a logic 1 of the destination address DA, a valid packet forward signal 51 is immediately outputted from the packet forward instructing circuit 500 while, at the same time, two LAN port select signals 542 and 543 are delivered from the decoder 540.

At this time, LANs 20 and 30 are in an available state (ready state). With ready signals R2 and R3 set to "1", AND gates 552 and 553 in a packet forward control circuit 55 deliver logic 1 signals to the switching network 53 to allow the output of the FIFO memory 421 to be connected to the LAN ports of LANs 20 and 30. Further, an OR gate 554 in the packet forward control circuit 55 delivers a forward start signal S1 to the FIFO memory 421.

Upon receipt of the logic 1 signals from the two AND gates 552 and 553 in the packet forward control circuit 55, the switching circuit 53 performs a switching operation to allow the output of the FIFO memory 421 to be connected simultaneously to the LAN ports of LANs 20 and 30.

The switching network 53 allows the multicast packet which is outputted from the FIFO memory 421 to be passed to the LAN port designated with the LAN port address of the address information from the FAT memory 43. In the present embodiment, the switching network 53 connects the output of the FIFO memory 421 to the ports of LANs 20 and 30 upon receipt of the logic 1 signals from the AND gates 552 and 553. The switching network 53 allows a multicast packet which comes from the FIFO memory 421 to be passed (broadcast) to the LAN ports of LANs 20 and 30.

At the time when the switching operation is done by the switching network 53 so as to connect the output of the FIFO memory 421 simultaneously to LANs 20 and 30, a forward start signal S1 is supplied from the OR gate 554 in the packet forward control circuit 55 to the FIFO memory 421. The FIFO memory 421, while sequentially receiving the multicast packet as an input from the LAN 10 side via the serial interface and holding it there, delivers an output in the order in which the multicast packet is received.

By so doing, the multicast packet which is outputted from the FIFO memory 421 is passed via the switching network 53 to all LANs except LAN 10, that is, to LANs 20 and 30 simultaneously.

In the case where, in the inter-LAN connection equipment 400 shown in FIG. 8, the multicast packet is sent via LAN 10, the FIFO memory 42 and switching network 53 are controlled immediately at the point of time in which the destination address DA of the multicast packet is held in the DA holding register 45. That is, the multicast packet inputted and held in the FIFO memory 421 is passed via the switching network 53 to the LAN ports of LANs 20 and 30.

For this reason, a delay time involved from when the reception of the multicast packet is started to when the actual forward of it is started is more compressed than the delay time (t1 in FIG. 7A) as set out in connection with the first embodiment. The forward of a multicast packet in the conventional equipment will be explained in FIG. 8. After the normal reception of one packet (packet) is completed under control of a LAN controller 52, the microprocessor 56 acknowledges the completed reception of the multicast packet. Then the LAN controllers corresponding to the LAN ports of the other LANs (LANs 20 and 30) are started and a multicast packet received at the receive-side LAN controllers 52 is sent to the LAN ports of LANs 20 and 30. In this way the forward of the multicast packet in the conventional equipment has required the same procedure as a conventional ordinary forward procedure as shown in FIG. 7B, that is, after the reception proceeding, the forward operation is effected in the order of the completion of packet reception, the handling of the forward procedure and the handling of transmission.

In the present invention, the multicast packet stored from the LAN controller 52 into the buffer 521 is not used for individual communication and, when the LAN controller 52 informs a notice representing the completion of reception, a corresponding multicast packet is discarded based on an instruction of the microprocessor 56. On the other hand, a discard instruction can be given not by the microprocessor but by a packet discard instructing circuit as in the case of the forward instruction from the packet forward instructing circuit 500. That is, in accordance with the multicast designation bit of the destination address DA in the DA holding register 45 a discard instruction can be given by a packet discard instructing circuit corresponding to the packet discard instructing circuit 48. In this case, it is possible to alleviate a load on the microprocessor. In the adoption of this procedure it is preferable to clear the FIFO memory 421 as in the first embodiment when a new multicast packet is received from LAN 10. Clearing the FIFO memory 421 in accordance with a packet discard signal 49 is not allowed because a multicast packet inputted and held in the FIFO memory 421 is erased.

According to the second embodiment as set out below it is not necessary to retrieve the table memory due to the use of the multicast packet. Therefore, the forward operation can be started immediately at a point of time in which the destination address of the multicast packet, that is, the multicast address is received. This ensures a more high-speed forward operation than in the case where an ordinary packet is used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An inter-LAN bridge equipment connected to at least two LANs comprising:

address learning means, provided for each LAN, for receiving from a given LAN a packet including a destination address and a source address, and for generating address information having the source address and a LAN port address for distinguishing the given LAN;

table memory address generating means, provided for each LAN, for generating a table memory address on the basis of the source address;

a shared table memory for allowing the address information which is generated from the address learning means to be registered in an entry designated by the table memory address generating means;

a first in—first out memory, provided for each LAN, for allowing the packet which is sent from the LAN to be stored therein;

first comparing means, provided for each LAN, for receiving the packet sent from the LAN, for extracting a destination address in the packet, for taking out the address information from the shared table memory at an entry corresponding to the destination address and for comparing the destination address with the source address in the address information;

second comparing means, provided for each LAN, for taking out the address information and for comparing a LAN port address of the LAN with the LAN port address in the address information from the shared table memory discarding means, provided for each LAN, for discarding the packet sent from the LAN when a result of comparison by the first and second comparing means represents a coincidence; and forward means, provided for each LAN, for allowing the packet which is stored in the first in—first out memory to be sent to the LAN corresponding to the LAN port address of the read address information when a result of comparison by the first comparing means shows a coincidence and a result of comparison by the second comprising means shows a noncoincidence.

2. The inter-LAN bridge equipment according to claim 1, wherein the forward means includes means for connecting an output of the first in—first out memory to a port of the transmit-destination LAN.

3. The inter-LAN bridge equipment according to claim 2, wherein the forward means includes means for preventing any forward from being made during a time period in which the port of the transmit-destination LAN is used.

4. The inter-LAN connection equipment according to claim 3, wherein the first in—first out memory is of a one-bit data width type.

5. The inter-LAN bridge equipment according to claim 1, wherein the forward means includes means for, when the destination address of the packet corresponds to a multicast address, controlling transmission of the packet to all other LAN irrespective of the results of comparison by the first and second comparing means.

6. An inter-LAN bridge equipment connected to at least two LANs comprising:

address learning means, provided for each LAN, for receiving from a given LAN a packet including a destination address and a source address, and for generating address information having the source address and a LAN port address for distinguishing the given LAN;

table memory address generating means, provided for each LAN, for generating a table memory address on the basis of the source address;

a shared table memory for allowing the address information which is generated from the address learning means to be registered in an entry designated by the table memory address generated from the table memory address generating means;

a first in—first out memory, provided for each LAN, for allowing the packet which is sent from the LAN to be stored therein;

first comparing means, provided for each LAN, for receiving the packet sent from the LAN, for extracting a destination address in the packet, for taking out the address information from the shared table memory at an entry corresponding to the destination address and for comparing the destination address with the source address in the address information;

second comparing means, provided for each LAN, for taking out the address information and for comparing a LAN port address of the LAN with the LAN port address in the address information from the shared table memory;

discarding means, provided for each LAN, for discarding the packet sent from the LAN when a result of comparison by the first and second comparing means represents a coincidence;

forward means, provided for each LAN, for allowing the packet which is stored in the first in—first out memory to be sent to the LAN corresponding to the LAN port address of the read address information when a result of comparison by the first comparing means shows a coincidence and a result of comparison by the second comparing means shows a noncoincidence; and means for, when the destination address of the packet corresponds to a multicast address, controlling to transmit the packet to all the other LAN irrespective of the results of comparison by the first and second comparing means.

7. The inter-LAN bridge equipment according to claim 6, wherein the forward means includes means for connecting an output of the first in—first out memory to a port of the transmit-destination LAN.

8. The inter-LAN bridge equipment according to claim 7, wherein the forward means includes means for preventing any forward from being made during a time period in which the port of the destination LAN is used.

9. The inter-LAN connection equipment according to claim 8, wherein the first in—first out memory is of a one-bit data width type.

10. An inter-LAN bridge equipment connected to at least two LANs comprising:

address learning circuit, provided for each LAN, for receiving from a given LAN a packet including a destination address and a source address, and for generating address information having the source address and a LAN port address for distinguishing the given LAN;

table memory address generating circuit, provided for each LAN, for generating a table memory address on the basis of the source address;

a shared table memory for allowing the address information which is generated from the address learning circuit to be registered in an entry designated by the table memory address generated from the table memory address generating circuit;

a first in—first out memory, provided for each LAN, for allowing the packet which is sent from the LAN to be stored therein;

first comparing circuit, provided for each LAN, for receiving the packet sent from the LAN, for extracting a destination address in the packet, for taking out the address information from the shared table memory at an entry corresponding to the destination address and for comparing the destination address with the source address in the address information;

second comparing circuit, provided for each LAN, for taking out the address information and for comparing a LAN port address of the LAN with the LAN port address in the address information from the shared table memory;

discarding circuit, provided for each LAN, for discarding the packet sent from the LAN when a result of comparison by the first and second comparing circuit represents a coincidence; and forward circuit, provided for each LAN, for allowing the packet which is stored in the first in—first out memory to be sent to the LAN corresponding to the LAN port address of the read address information when a result of comparison by the first comparing circuit shows a coincidence and a result of comparison by the second comparing circuit shows a noncoincidence.

11. The inter-LAN bridge equipment according to claim 10, wherein the forward circuit includes a circuit for connecting an output of the first in—first out memory to a port of the transmit-destination LAN.

12. The inter-LAN bridge equipment according to claim 11, wherein the forward circuit includes circuit for preventing any forward from being made during a time period in which the port of the transmit-destination LAN is used.

13. The inter-LAN connection equipment according to claim 12, wherein the first in—first out memory is of a one-bit data width type.

14. The inter-LAN bridge equipment according to claim 10, wherein the forward circuit includes a circuit for, when the destination address of the packet corresponds to a multicast address, controlling transmission of the packet to all other LAN irrespective of the results of comparison by the first and second comparing circuit.

* * * * *